(12) United States Patent
Viaud

(10) Patent No.: US 7,252,587 B2
(45) Date of Patent: Aug. 7, 2007

(54) CROP PROCESSING DEVICE WITH RELIEF SYSTEM

(75) Inventor: Jean Viaud, Gray (FR)

(73) Assignee: Deere & Company, Moline, IL (US)

( * ) Notice: Subject to any disclaimer, the term of this patent is extended or adjusted under 35 U.S.C. 154(b) by 271 days.

(21) Appl. No.: 11/077,758

(22) Filed: Mar. 11, 2005

(65) Prior Publication Data
US 2005/0198936 A1    Sep. 15, 2005

(30) Foreign Application Priority Data
Mar. 12, 2004  (EP) .................................. 04101026

(51) Int. Cl.
*A01F 12/28* (2006.01)
(52) U.S. Cl. ..................................... 460/109
(58) Field of Classification Search ................... 460/62, 460/63, 71, 72, 107–109, 5; 56/16.4 R, 341; 241/28, 186.3, 223
See application file for complete search history.

(56) References Cited

U.S. PATENT DOCUMENTS

| | | | | |
|---|---|---|---|---|
| 740,215 | A | * 9/1903 | Bartholow | .................. 460/109 |
| 2,484,228 | A | * 10/1949 | Isay | .............................. 460/46 |
| 4,466,231 | A | * 8/1984 | Rowland-Hill et al. | ......... 460/2 |
| 4,539,798 | A | * 9/1985 | Klinner | .................... 56/16.4 R |
| 4,706,690 | A | * 11/1987 | Huhman | ....................... 460/84 |
| 4,711,252 | A | * 12/1987 | Bernhardt et al. | ........... 460/107 |
| 4,993,991 | A | * 2/1991 | Yarmashev et al. | ........... 460/66 |
| 5,819,517 | A |  10/1998 | Amanatidis et al. | |
| 6,152,820 | A | * 11/2000 | Heidjann et al. | ............ 460/112 |
| 6,358,142 | B1 | * 3/2002 | Imel et al. | ................... 460/109 |
| 6,442,916 | B1 | * 9/2002 | Pope | ....................... 56/10.2 R |
| 6,443,835 | B1 | * 9/2002 | Imel et al. | ................... 460/107 |
| 6,530,833 | B2 | * 3/2003 | Imel et al. | ................... 460/109 |
| 6,742,732 | B1 | * 6/2004 | Hundt et al. | ................... 241/28 |
| 7,059,961 | B2 | * 6/2006 | Schenk | ....................... 460/109 |

FOREIGN PATENT DOCUMENTS

| DE | 195 46 263 | 12/1995 |
|---|---|---|
| DE | 198 41 598 | 3/2000 |
| EP | 1 062 860 | 12/2000 |

* cited by examiner

*Primary Examiner*—Árpád Fábián Kovács

(57) ABSTRACT

A crop processing device includes a rotor with crop engaging means, a sheet partly surrounding the rotor, whereas the sheet is circumferentially moveable with respect to the rotor, and a control providing resistance to circumferential movement of the sheet.

21 Claims, 5 Drawing Sheets

CROP PROCESSING DEVICE WITH RELIEF SYSTEM

FIELD OF THE INVENTION

The present invention relates to a crop processing device having a rotor with crop engaging means and a sheet partly surrounding said rotor and the use of such a device.

BACKGROUND OF THE INVENTION

Prior patents DE 195 46 263 and DE 198 41 598 disclose cutting devices with a rotor and a bottom sheet, whereas the position of the bottom sheet is changeable as a function of the load created by the crop. The bottom sheet moves away from the rotor in an overload case and opens the throat thereby. It has been found, that instead of avoiding plugging such movement allows even more crop to enter, which increases the tendency to put the whole system on halt.

The problem this invention is based on is seen in finding a crop processing device, which in an overload situation avoids plugging.

SUMMARY OF THE INVENTION

This problem is solved in an innovative way by means of the teaching of claim 1, whereas advantageous features further developing the invention are given in the claims related to claim 1.

By means of this teaching the sheet will move a certain distance as soon as friction between the crop and the sheet increases. This allows the rotor to rotate further and possibly to overcome the high compression. However, since the throat does not open no more crop can enter the space. This is especially important in cases, in which the crop mat rolls on itself and could clog the throat area, if it is allowed to enter the space. The control may be set to allow a circumferential movement of such amount and direction, that immediate clogging is avoided. The rotor may be any revolving element (not only round and cylindrical) that repeatedly grasps and delivers crop or other material to be conveyed. The crop engaging elements may be teeth, tines, bars, etc. and may be used to cut, condition, or just convey the crop. The sheet may be of rigid construction or a sheet metal with certain flexibility. It may consist of a sheet of fixed length in the circumferential direction or of at least two parts overlapping each other. Overlapping sheet portions have as an advantage that no gap will occur, when one of the parts moves in the circumferential direction. Of course "circumferential" may also allow a limited radial movement towards or away from the rotor. The control may be a motor, a linK or any other device.

In some cases too much crop may have entered the space between the sheet and the rotor and either plugging is unavoidable or the crop must be given more space, or the crop processing device has to be cleaned. For such a case in the final stage the sheet can move radially outwardly. Such movement hardly acts against resistance, but allows merely decompression.

In order to avoid wear and blocking in the device itself, it is proposed to provide for a transition area to smoothen the movement to a certain degree.

By using a control having an elastic moving behavior, the sheet will not only be moved against a force, possibly with increasing magnitude, but it will also remove the sheet to a start position, as soon as the load is gone. Such elasticity may be provided by a mechanical spring, a gas accumulator, a valve in a hydraulic or pneumatic circuit, an electrical motor or the like.

The movement of the sheet in the circumferential and/or the radial direction may be controlled and guided in all possible ways. However, mechanical solutions, like a track, a link, a rail, a slot or the like have been found as being highly reliable. The sheet may enter such track or the like by means of rollers, or by a thrust bearing. The links may be parallel links or those pivoting about the center axis, or close to it, of the rotor. Slots in a housing may be used as well or instead of. Such guiding devices may have paths of more than a circular or straight form. Furthermore, stops may be provided to block a portion of the path provided by said guiding devices.

Having in mind, that a crop processing device may be quite wide compared to its length, a stress free movement without any jam may be assured by the use of a direction control device acting onto the sheet. Such a direction control device may comprise sort of a torsion bar and lever arrangement, which avoids any play and uncontrolled movement. Alternatively cables, chains, links or the like may be used to assure, that the sheet is moved the same distance at both ends. It would also be possible to use electric or hydraulic circuits, which provide for a uniform movement at both ends.

Using a sensor at the entrance and/or exit end of the sheet helps, to indicate to an operator, that an overload situation is present such a sensor may also control the machine, to which the crop processing device is connected; for example, the pick-up upstream of the rotor may be stopped and thus, no more crop may be fed to the gap between the sheet and the rotor.

While it would be possible to have crop engaging elements separate from the sheet, it facilitates the control of the sheet together with the crop engaging elements, if they are connected to each other. Furthermore, no slots for the crop engaging elements are present, in which crop could hairpin and the geometric relationship between them and the sheet remains unchanged, if they form a single assembly.

If the resistance against a movement in the circumferential direction is higher than in the radial direction, under load the sheet will tend to stay in its normal and initial position. Accordingly this status is difficult to overcome. Contrary, as soon as a situation is reached, in which relief is needed, this will happen at once, if the resistance to move radially outwardly is quite low.

In order to adjust the behavior of the sheet to the circumstances under which the cop processing device operates, the resistance applied on the sheet is adjustable, in particular as a function of the torque or of the speed of the rotor. This could lead to a control, in which the resistance is higher, the higher the sensed speed and torque of the rotor are. Especially a high rotor speed represents a high momentum, which is able to overcome a higher crop resistance than at a lower speed.

Such a crop processing device is insensitive to the location of the sheet; i.e., it can be operated as an overshot, as well as an undershot device. In the case of a round baler this allows to adjust to the rotational sense of the round bale.

Having a relief device, like a valve, a double acting actuator (hydraulic, electric or pneumatic) or the like, allows to remove the sheets against no resistance if need be. Such a relief device could also be formed as a lever or actuator to make a mechanical spring (coil, leaf, torsion type) ineffective.

Due to the high capability to adjust to varying circumstances during the conveyance of crop, such a crop processing device is of very good use in a round or square baler, a self-loading wagon, a harvester, a combine or the like.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE EMBODIMENTS

Figure 1:
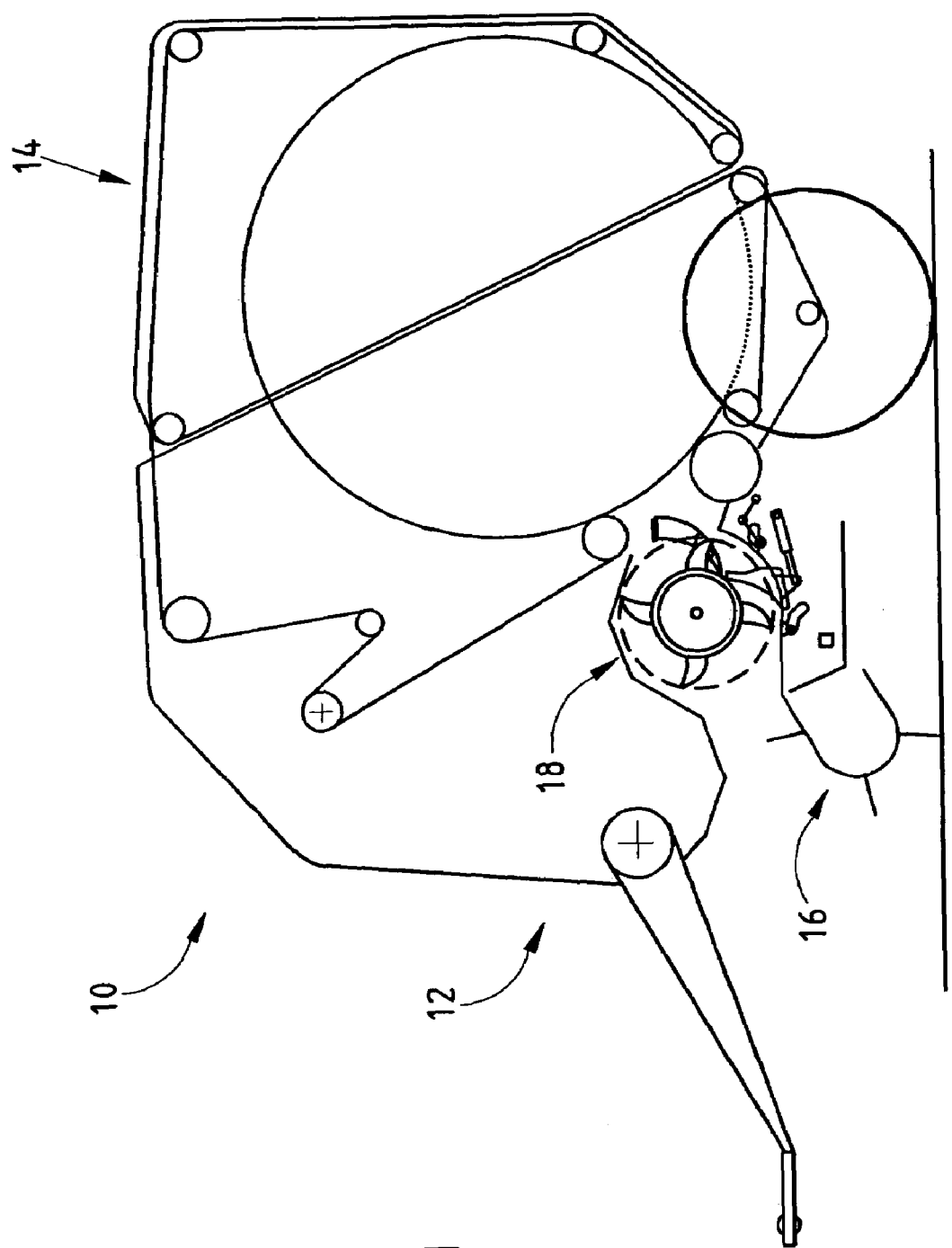
FIG. 1 illustrates a round baler having an undershot crop processing device in a non-load mode.

A round baler 10 according to FIG. 1 has a frame 12, a baling assembly 14, a pick-up 16 and an inventive crop processing device 18.

The round baler 10 is representative for any type of a crop collecting machine, like all types of round balers, large and small square balers, loading wagons, forage harvesters etc. useful in agriculture, forestry and in industry.

The frame 12 is composed of a chassis, tongue, axle, wheels, shielding, etc. and carries the baling assembly 14, the pick-up 16 and the crop processing device 18 for a movement over a field, a street etc. During the movement over a field, crop lying on the ground in a windrow is picked up and delivered to the baling assembly 14 for baling.

The baling assembly 14 is representative for other crop processing means and may be formed as a fixed, variable or mixed chamber pressing means, using belts, rolls, chains, or the like.

The pick-up 16 is as well of ordinary kind, known in the prior art and is located upstream of the crop processing device 18.

The round baler 10 described is of ordinary design known to those skilled in the art. Several features, like net or twine wrapping are not described but may be present.

Figure 2:
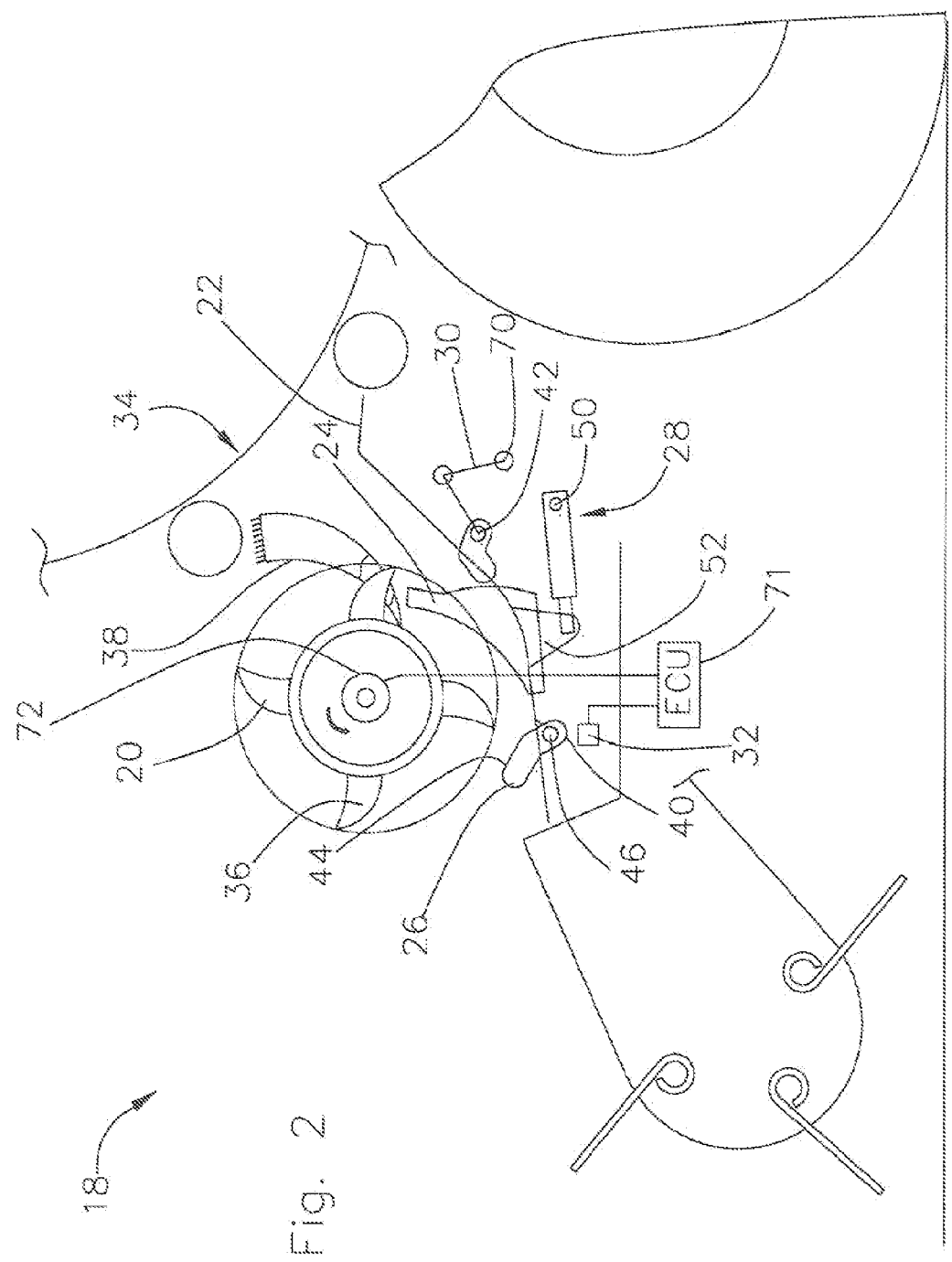
FIG. 2 shows the crop processing device of FIG. 1 in an overload mode.

The crop processing device 18 in FIG. 1 is made of the undershot type and comprises a rotor 20, a sheet 22, crop processing means 24, guide 26, a control 28, a direction control 30 and a sensor 32, shown in FIG. 2.

The crop processing device 18 is used to assume crop from the pick-up, process it, e.g. cut it, and deliver it to an inlet 34 in the baling assembly 14. Since the windrow of crop is not uniform in size and density, the load between rotor 20 and the sheet 22 varies during the operation. The crop processing device 18 is designed to cope with at least part of the load variations and until a severe overload stage is reached.

The rotor 20 has a series of spaced and parallel rings with crop engaging elements 36, which may grasp and deliver the crop. The sense of rotation is indicated by an arrow. The drive of the rotor 20 may be reversed and decelerated or accelerated, furthermore, sensors (not shown) may be provided for sensing the speed and direction of rotation of the rotor. The crop engaging elements 36 move through slots in a stripper 38, which prevent the crop from rotating along with the rotor, instead of being delivered to the inlet 34.

The sheet 22 is shown as a curved sheet of metal, following a part of a circle about the center of rotation of the rotor 20. While it is not shown here, the sheet 22 is reinforced by cross bars, a frame or the like, which assures, that it does not bend under the load applied by the crop. The sheet 22 extends between the pick-up 16 and the inlet 34. The sheet 22 is carried in a front portion by a front traverse 40 and in a rear portion by a rear traverse 42, both extending over the full width of the sheet 22 and may be combined with or connected to the cross bars. While the term "sheet" is used, this does not exclude surfaces of uneven structure, of assemblies made of bars, or a grate or the like.

In this embodiment the crop processing means 24 are formed as knives fixed on a transverse carrier or subframe (not shown), which latter is connected to the sheet 22. The crop processing means 24 extend through non-shown slots in the sheet 22, as this is known. In this case, in which the crop processing means 24 are formed as knives, those are provided either individually or as an assembly, with overload or safety devices, allowing a movement against a spring or the like, if a foreign object or other obstacle enters the crop path; such systems are known to those skilled in the art. The traverses 40 and 42 may be connected to the sheet 22 releasably, such that the sheet with the crop processing means 24 can be dismounted for maintenance or to provide easy access to the rotor 20.

The guide 26 is formed as slots per traverse 40, 42 in the frame 12 or side walls laterally of the sheet 22. Such guides 26 may be cut in sheet metal, beams, consoles or the like. Alternatively tracks may be provided in cast iron, U-shaped form steel or the like. The guides 26 receive the end areas of the traverses 40, 42 by means of rolls, slide bearings or the like. Each guide contains an upstream section 44 oriented approximately tangentially with respect to the center axis of the rotor 20, and a downstream section 46 running under an angle of about 130 degrees (at front traverse 40) or almost 180 degrees (at rear traverse 42) with respect to a radial line through the axis of the rotor 20. Both sections enter into each other and provide a path for the movement of the traverses 40, 42. The upstream section 44 extends about substantially 10 to 30 degrees of a circle about the axis of the rotor 20. A movement of the sheet 22 and its traverses 40, 42 through these sections 44 provide for a movement substantially on a circle about the axis of rotation of the rotor 20, i.e. without or hardly changing the distance to the rotor 20. In contrast the sections 46 allow a movement of the sheet 22 radially away from the rotor 20. Thus, the guide 26 and traverses 40 and 42 cooperate to define a support arrangement for the sheet 22.

The control 28, also shown in FIGS. 4-7, is hydraulic in this embodiment, but could be of any other kind, which is useful to provide some resistance against the movement of the sheet 22. As shown in FIG. 2, a hydraulic actuator 48, is attached at one end by means of a bolt 50 to the frame 12 and at the other end to a retainer 52 fixed to the sheet 22 or to the crop processing means 24. The actuator 48 is double acting (in two directions) in the case of FIGS. 4 and 5 and single acting (in one direction) in the case of FIGS. 6 and 7. The control 28 further comprises a pump 54, a sump 56, a control valve 58, a gas accumulator 60, a pilot operated check valve 62 and non-specified lines connecting them as shown in the drawings and known to the man skilled in the art. Other ordinary means like relief valve, etc. known to the man in the art are not shown for reasons of simplicity. In the position of the control valve 58 at the R.H. side, the pump 54 is connected via the control valve 58 via the opening check valve 62 to the piston bottom side of the actuator 48 and the gas accumulator 60; in this situation and with reference to FIG. 2 the sheet 22 and the crop processing device 18 is moved towards the pick-up. The piston rod side of the actuator 48 is connected to the sump 56 in this situation and does not provide any resistance. In a center position of the control valve 58 all lines are blocked and a movement of the actuator 48 is possible only against the resistance in the gas accumulator 60. In the L.H. position of the control valve 58 fluid is delivered to the piston rod side of the actuator 48 and forced out of the piston bottom side of it, through the check valve 62 which is opened via a pilot line, to the sump 56. Such movement may be initiated by an operator, e.g. to unplug the crop path along the sheet 22.

Figure 5:
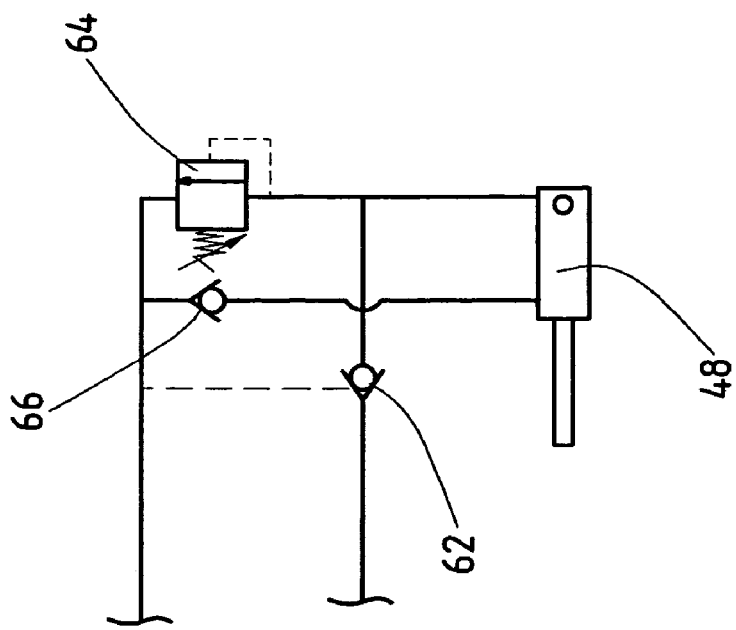
FIG. 5 is a portion of a hydraulic circuit for a double acting actuator with a relief valve.
Figure 4:
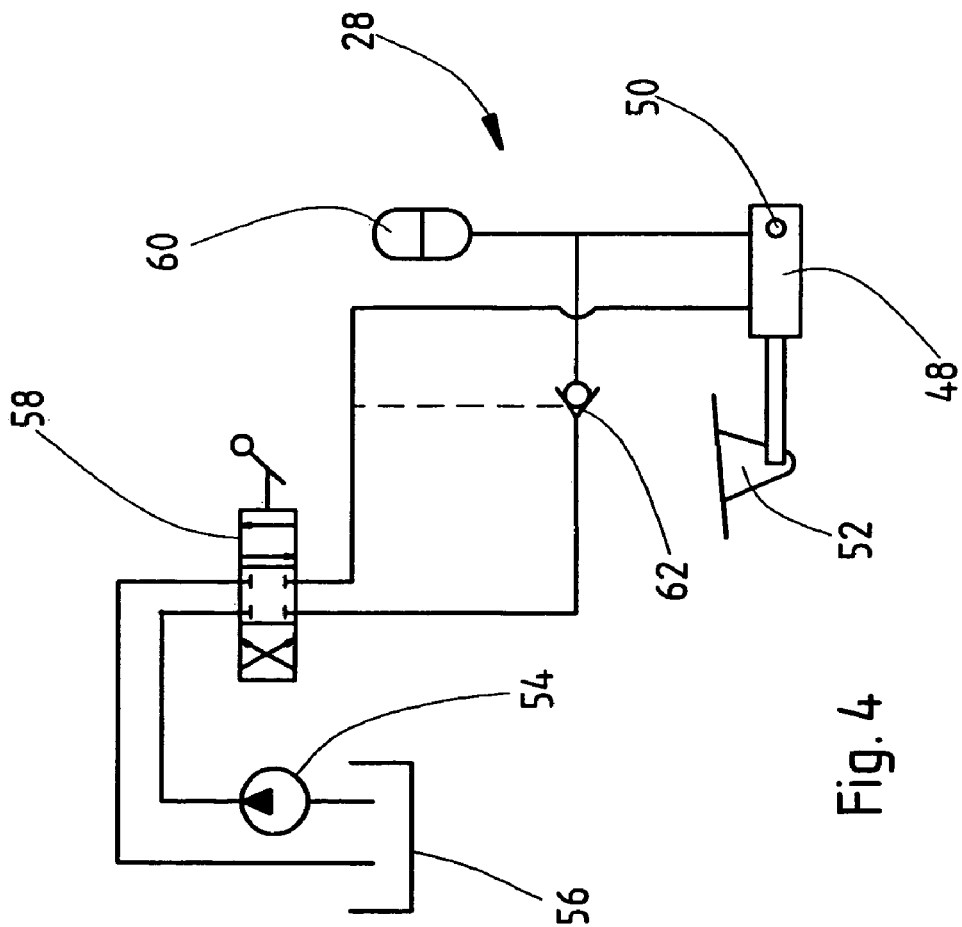
FIG. 4 is a portion of a hydraulic circuit for a double acting actuator with a gas accumulator.
Figure 7:
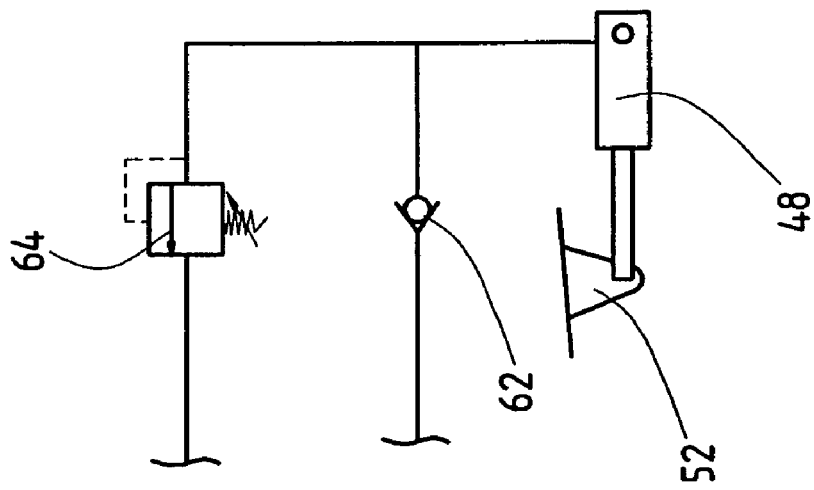
FIG. 7 is a portion of a hydraulic circuit for a single acting actuator with a relief valve.

FIG. 5 shows a similar control, in which the gas accumulator 60 is replaced by a relief valve 64 and a second pilot operated check valve 66, which allows fluid leaving the piston bottom side through the relief valve 64 flowing back to the piston rod side of the actuator 48.

Figure 6:
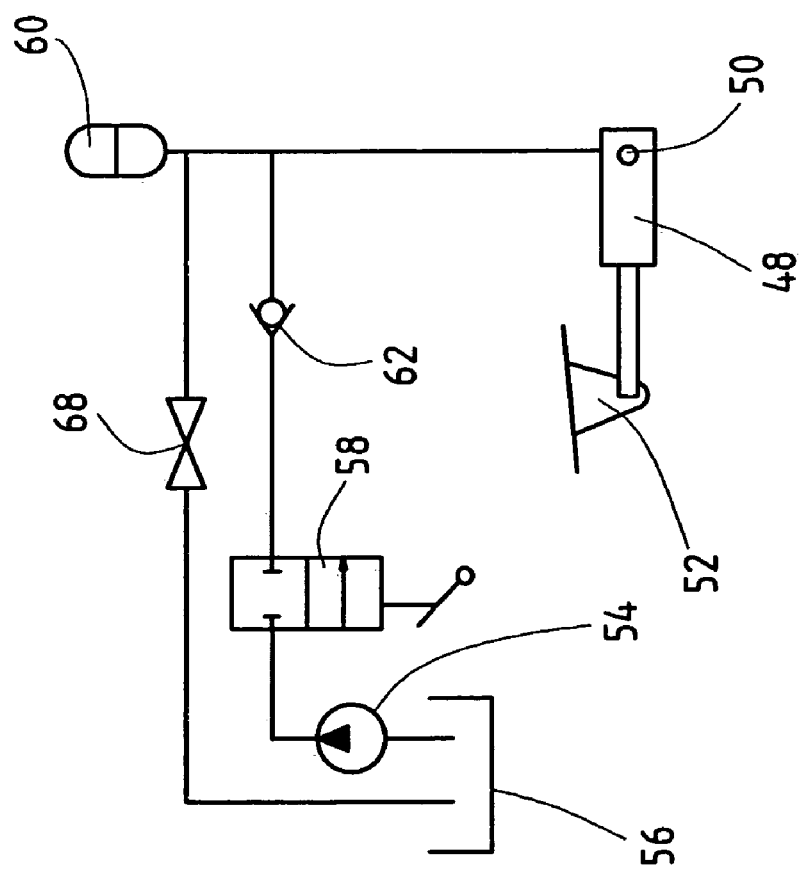
FIG. 6 is a portion of a hydraulic circuit for a single acting actuator with a gas accumulator.

FIG. 6 also has a pump 54 to feed pressurized fluid via a one position of a two position control valve 58 and via a check valve 62, not pilot operated, to the piston bottom side of the actuator 48 and the gas accumulator 60. A line between the piston bottom side of the actuator and the sump 56 is closed by a relief device 68 in the form of a valve in this situation. In another position of the control valve 58 the pump does not feed any fluid through the control valve 58. Fluid in the actuator cannot escape, due to the check valve, but may move into and out of the gas accumulator 60. In this mode the sheet 22 and the crop processing means 24 can move against the resistance provided by the gas accumulator 60. If it is needed to move the sheet 22 into its position remote from the rotor 20, see FIG. 2, the relief device 68 is opened and the circuit is relieved. In the embodiment shown in FIG. 7 the gas accumulator 60 is again replaced by a relief valve 64, the pressure of which is adjustable to allow a movement of sheet 22 against no resistance, if need be.

The direction control 30 in this embodiment comprises a linkage, anchored with a torsion bar 70, which provides a simultaneous and similar movement on both sides of the downstream traverse 42. This torsion bar 70 exerts a certain resistance on the downstream traverse 42 to correct eventual misalignment of the sheet 22.

A sensor 32 is fixed to the frame 12 or the part of it carrying the sheet 22 and is formed as a proximity switch, which realizes when the sheet 22 has either left or reached a certain position. Alternatively several sensors 32 may be provided, either along the sheet 22 or along the movement path of it. The sensor 32 may be used to either control the operation of the rotor 20, or to give an alert to an operator, or the like. The sensor 32 is connected to an electronic control unit (ECU) 71.

Another sensor 72 may be provided to analyze the speed or the torque of the rotor 20. The findings of this sensor 72 are sent to the electronic control unit. 71.

The electronic control unit 71 may be used to either control the operation of the rotor 20 or of the actuator 48, or to give an alert to an operator, or the like.

Figure 3:
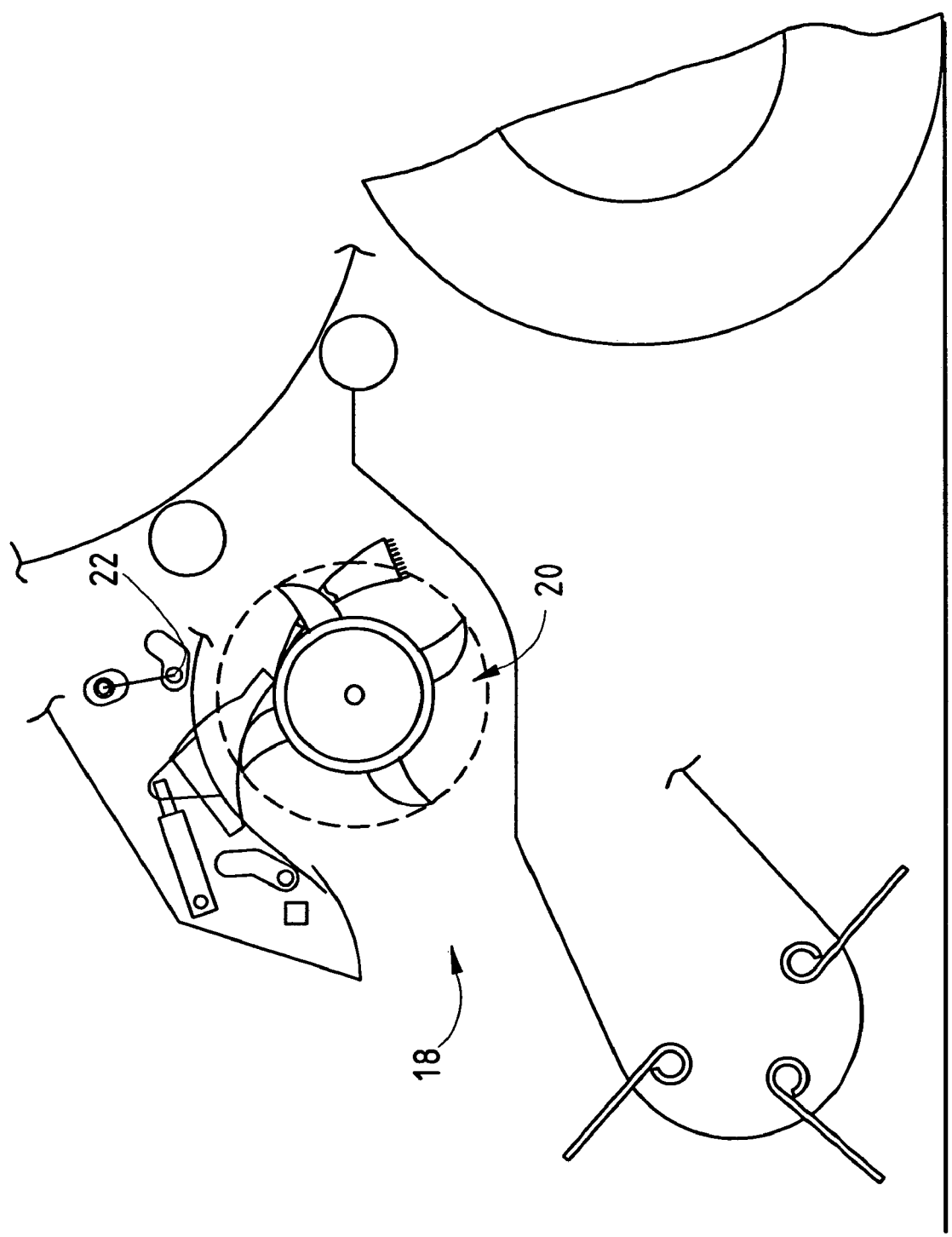
FIG. 3 is an overshot crop processing device in a non-load mode.

FIG. 3 shows substantially the same solution as the one shown in FIG. 2, whereas the sheet 22 and all related components are located above the rotor 20, instead of below it.

In accordance with the provisions of the patent statutes, the present invention has been described in what is considered to represent its preferred embodiment. However, it should be noted that the invention can be practiced otherwise than as specifically illustrated and described.

What is claimed is:

1. A crop processing device comprising:
    a rotor with crop engaging means mounted for rotation about an axis;
    a sheet partly surrounding the rotor;
    a support arrangement coupled to said sheet so as to permit said sheet to be circumferentially moveable with respect to the rotor; and
    a control coupled to said sheet and providing yieldable resistance to circumferential movement of the sheet.

2. The crop processing device according to claim 1, wherein said support arrangement in addition permits the sheet is to be radially moveable with respect to the rotor subsequent to circumferential movement of the sheet.

3. The crop processing device according to claim 2, wherein said support arrangement further includes a transition area to provide a smooth transition from circumferential movement to radial movement of the sheet.

4. The crop processing device according to claim 2, wherein said control is arranged such that the resistance against a movement of the sheet in the circumferential direction is higher than the resistance against movement of the sheet in the radial direction.

5. The crop processing device according to claim 1, wherein the control is elastic in nature.

6. The crop processing device according to claim 5, wherein the control includes one of a mechanical spring, a gas accumulator, a relief valve, and an electric motor.

7. The crop processing device according to claim 1, wherein said support arrangement includes at least one guide to control the movement of the sheet.

8. The crop processing device according to claim 7 wherein the guide is one of a track, a link, a rail, and a slot.

9. The crop processing device according to claim 1, further including a direction control acting on the sheet.

10. The crop processing device according to claim 9 wherein the direction control is a torsion bar.

11. The crop processing device according to claim 1, further including at least one sensor to detect one of a position or a movement of the sheet.

12. The crop processing device according to claim 1, wherein the sheet includes crop processing means connected thereto.

13. The crop processing device according to claim 12 wherein the crop processing means are conditioning elements.

14. The crop processing device according to claim 12 wherein the crop processing means are knives.

15. The crop processing device according to claim 1, wherein said support arrangement and said control cooperate with each other such that the position of the sheet is adjustable.

16. The crop processing device according to claim 15, wherein the position of the sheet is controlled by an electronic control unit.

17. The crop processing device according to claim 16 and further including at least one of a torque or a speed sensor to said rotor and to said electronic control unit wherein the electronic control unit monitors the speed and torque of the rotor and controls the position of the sheet as a function of the torque and speed of the rotor.

18. The crop processing device according to claim 1, wherein the sheet is located above the rotor.

19. The crop processing device according to claim 1, wherein the sheet is located below the rotor.

20. The crop processing device according to claim 1, wherein the control includes a relief device.

21. The crop processing device according to claim 1, wherein the crop processing device is adapted to be used in one of a baler, a self-loading wagon, a harvester, and a combine.

\* \* \* \* \*